United States Patent [19]

Barnhart

[11] Patent Number: 4,715,320
[45] Date of Patent: Dec. 29, 1987

[54] SANITARY DEVICE FOR ANIMALS

[76] Inventor: William D. Barnhart, 629 Ranson St., Ripon, Wis. 54971

[21] Appl. No.: 871,927

[22] Filed: Jun. 9, 1986

[51] Int. Cl.⁴ .............................................. A47K 11/02
[52] U.S. Cl. ...................................... 119/1; 38/107.2; 160/378
[58] Field of Search ................... 119/1; 38/102, 102.1, 38/102.2, 102.3, 102.91; 160/378, 380, 352

[56] References Cited

U.S. PATENT DOCUMENTS

| 189,758 | 4/1977 | Lemman | 160/378 |
| 3,358,647 | 12/1967 | Wilson | 119/1 |
| 3,416,495 | 12/1968 | Wilson | 119/1 |
| 3,771,493 | 11/1973 | Chandor | 119/1 |
| 3,885,333 | 5/1975 | Zachary | 38/102.2 |
| 4,485,574 | 12/1984 | Bennetot | 38/102.2 |

Primary Examiner—William F. Pate, III
Assistant Examiner—Richard Chilcot, Jr.
Attorney, Agent, or Firm—Donald Cayen

[57] ABSTRACT

A sanitary receptacle for animal waste matter is created from three concentric hoops and a sheet of thin flexible material. The material, which may be newspaper, is spread over the inner hoop. The newspaper is captured in the annular space between the inner and center hoops by placing the center hoop on top of the newspaper and pushing the center hoop over the inner hoop. After inverting the inner and center hoops and the captured newspaper, the outer hoop is pushed over the newspaper and the center hoop from the side opposite the center hoop, thereby capturing the material between the center and outer hoops. Removing the inner and outer hoops from the assembled sanitary receptacle allows the edges of the newspaper to be brought together to create a sack for disposing of the animal waste matter deposited on the newspaper.

12 Claims, 4 Drawing Figures

SANITARY DEVICE FOR ANIMALS

BACKGROUND OF THE INVENTION

1. Field of the Invention

This invention pertains to sanitation, and more particularly to apparatus for sanitarily collecting and disposing of animal wastes.

2. Description of the Prior Art

It is well known that training a pet to eliminate out of doors is an irksome chore. Even after the animal has been trained, it still may frequently be necessary to confine the pet indoors for extended times. In such instances, it is important that the pet eliminate only at a preselected location. Further, it is also highly desirable that the waste matter be easily, quickly, and sanitarily removed from the indoor location for proper disposal.

Litter boxes are in widespread use for pet cats. However, litter boxes are not suitable for dogs. Newspapers may be laid on the floor for a dog's use, but the newspapers tend to scatter easily. Further, newspapers on a floor do not positively confine the waste matter within a fixed boundary. Consequently, dog owners are often limited to merely shutting their unattended pets in the room least likely to be damaged by waste matter.

Thus, a need exists for a device that encourages a pet dog to defecate in a specific indoor location and that permits quick and sanitary clean up of the wastes.

SUMMARY OF THE INVENTION

In accordance with the present invention, inexpensive and sanitary means is provided for receiving and facilitating disposal of pet waste matter. This is accomplished by apparatus that includes a trio of hoops arranged to releasably hold one or more sheets of flexible material in a unitary receptacle.

The hoops are arranged concentrically, and they cooperate to capture a sheet of flexible material to hold the waste matter in place within fixed confines. The flexible material, which may be newspaper, is captured within annular spaces between the three hoops to create tne receptacle for receiving the animal waste. The hoops are dimensioned such that the outermost hoop has a diameter less than the width of a standard sheet of newspaper.

The receptacle is assembled by first placing the innermost of the three hoops on the floor and then placing a sheet of newspaper over the inner hoop. Next, the center hoop is placed on top of the newspaper concentric with the inner hoop, and the center hoop is pushed down over the inner hoop, thereby capturing the newspaper between the inner and center hoops. The two hoops and captured newspaper are then inverted. The outer hoop is placed on top of the newspaper edges lying outside of the center hoop and it is then pushed down over the center hoop, thereby capturing the newspaper between the center and outer hoops. When the receptacle is completely formed, the inner and outer hoops lie on top of the newspaper and the center hoop is under the newspaper. The center portion of the newspaper inside the inner hoop and the outer edges of the newspaper outside of the outer hoop lie flat and neatly on the floor.

When it is desired to dispose of the waste matter, the inner and outer hoops are merely lifted off the newspaper. The edges of the newspaper are gathered together to form a sanitary sack with the waste matter inside. The paper sack and waste matter may then be easily and safely disposed of. A fresh newspaper may then be interleaved with the three hoops in the manner previously described to make another sanitary receptacle.

Other aims and advantages of the invention will become apparent to those skilled in the art from reading the detailed disclosure.

DETAILED DESCRIPTION OF THE INVENTION

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

Figure 1:
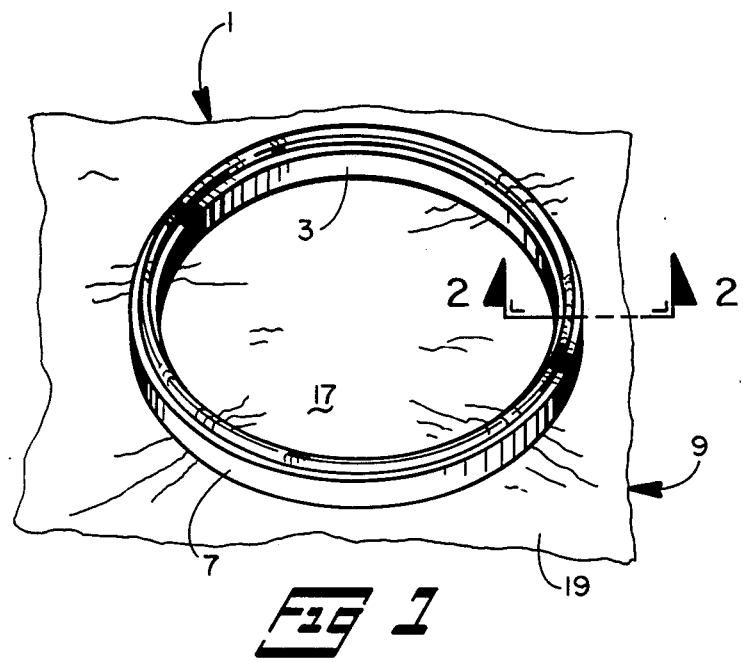
FIG. 1 is a perspective view of the sanitary device of the present invention.

Referring to FIG. 1, a sanitary receptacle 1 is illustrated that includes the present invention. the sanitary receptacle is particularly useful for receiving and facilitating disposal of animal waste matter, but it will be understood that the invention is not limited to sanitation applications.

Figure 2:
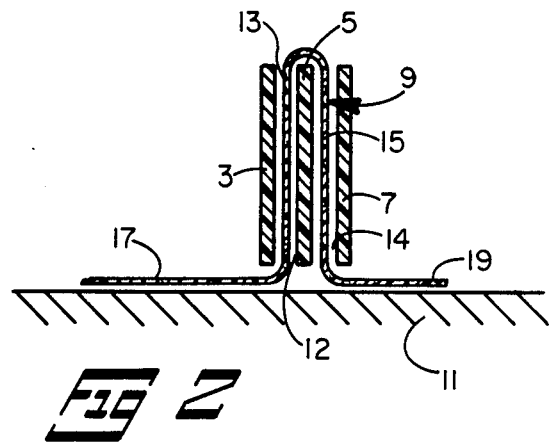
FIG. 2 is a sectional view taken along lines 2—2 of FIG. 1.
Figure 4:
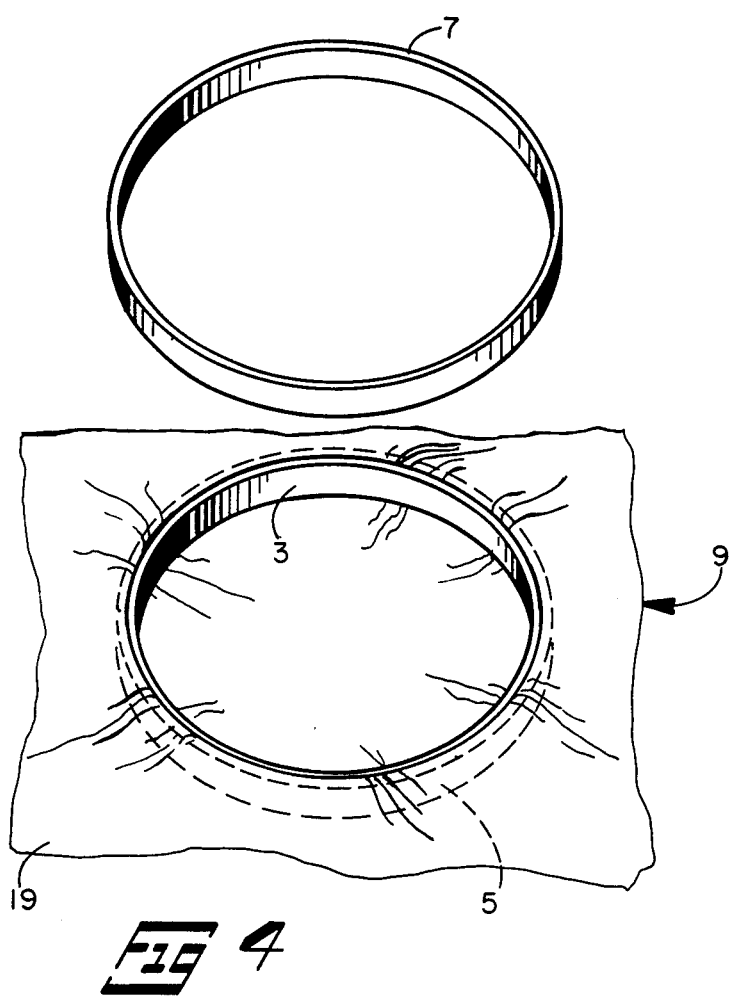
FIG. 4 is a perspective view of the components of the present invention arranged in a subsequent step during the creating of an animal waste receptacle according to the present invention.

As best shown in FIGS. 2 and 4, the sanitary receptacle 1 comprises a trio of concentric hoops together with one or more sheets of thin flexible material captured and held in place by the hoops. The hoops include an inner hoop 3, a center hoop 5, and an outer hoop 7. The respective hoops have radial clearances between them, as will be described in detail hereinafter.

The flexible material 9 is of a larger area than the diameter of the outer hoop 7. The material is preferably of very low cost, so as to permit it to be readily disposable. Newspaper is a satisfactory choice for the material 9.

The hoops 3, 5, and 7 may be made of any suitable material. For sanitation purposes, the preferred material is a smooth and slippery synthetic plastic, such as polypropelene.

Figure 3:
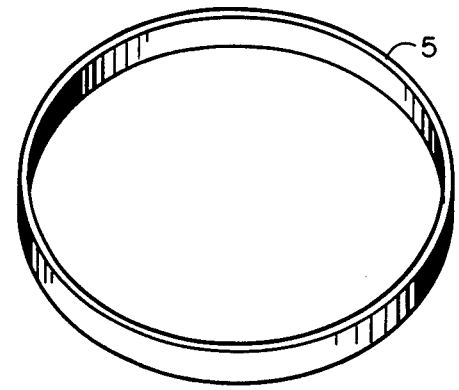
FIG. 3 is a partially broken perspective view of some of the components of the present invention arranged in an initial step during the creation of an animal waste matter receptacle according to the present invention.
Figure 3:
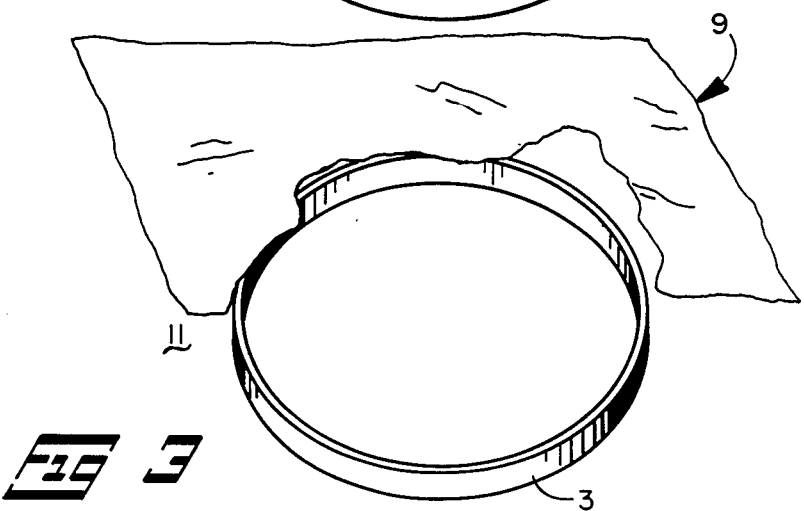

To use the hoops 3, 5 and 7, of the present invention to create a sanitary receptacle 1, the inner hoop 3 is placed on a floor 11, FIG. 3. The sheet 9 is placed on top of the inner hoop to span the area inside the hoop. The center hoop 5 is then slipped over the inner hoop from the top side of the material, thereby creating an annular space 12 between the inner and center hoops. Simultaneously, a portion of the material edges 19 extending outside the inner hoop periphery is folded into an annular ring 13 that is captured in the annular space 12, FIG. 2. In FIG. 2, clearances between the floor 11 and the various components of the receptacle are shown exaggerated for clarity. Next, the inner and center hoops, with the sheet captured therebetween, are inverted, as shown in FIG. 4. Finally, the outer hoop 7 is placed on the material edges 19 and pushed over the center hoop, thereby creating a second annular space 14 between the center and outer hoops. Simultaneously, a second portion of the material edges 19 is formed into a second annular ring 15 that is captured in the annular space 14 between the center and outer hoops, FIG. 2.

The resulting sanitary receptacle 1 thus has a neat and flat interior section 17 of material 9 that lies adjacent the floor 11. Further, the edges 19 of the material outside the hoops also lie flat and neatly on the floor, thereby reducing the possibility of accidentally kicking or otherwise moving the sanitary receptacle from its intended location. In addition to holding the sheet of material in place, the hoops also function as vertical walls to create a fixed confine for the waste matter, so that the possibility of accidental displacement of the waste matter to areas outside the receptacle is eliminated.

I have found that pet dogs are most likely to use the sanitary receptacle 1 of the present invention when the diameters and widths of the hoops 3, 5, and 7 are within certain limits. Moreover, a trade-off between heavy hoops that are more likely to remain in place on the floor and lighter hoops for easy assembly and disassembly with the material 9 requires that the hoops made from the preferred plastic material have rather closely defined dimensions. The hoops best achieve their intended purpose when the outer diameter of the inner hoop is approximately 17 to 19 inches, and when the wall thickness of the hoops is about 0.09 to 0.10 inches.

To enable the material 9 to be properly captured between the hoops 3 and 5 in the annular space 12, the diametral clearance between the outer diameter of the iner hoop and the inner diameter of the center hoop is preferably about 0.25 inches. The diametral clearance between the outer diameter of the center hoop and the inner diameter of the outer hoop 7 is also preferably about 0.25 inches. The preferred length for all the hoops is about 1.25 inches, as that dimensions establishes a positive confine for the pet waste matter within the sanitary receptacle 1 without establishing a barrier that the pet is reluctant to cross.

If desired, more than one layer of flexible material 9 may be employed. For example, several layers of newspapers may be used. Alternately, a layer of moisture impervious material may be used in place of or in combination with one or more layers of newspaper. The diametral clearance between the respective hoops is designed to accommodate several layers of material without the sheets being torned when the hoops are placed over each other. To entice the animal to defecate within the sanitary receptacle, a urine-fecal scent may be sprayed or dropped near the center of the interior section 17.

When it is desired to dispose of the animal waste material deposited in the sanitary receptacle 1, it is necessary only to lift the inner and outer hoops 3 and 7, respectively, from the top of the material 9, FIG. 1. The edges 19 of the material are then drawn upwardly and together to create a sack with the waste matter remaining in the center portion 17 at the bottom of the sack. The sack and waste matter are then disposed of in a convenient and sanitary manner. The hoops are immediately ready to cooperate again with each other to hold another flexible sheet and create another sanitary receptacle.

Thus, it is apparent that there has been provided, in accordance with the invention, a sanitary device for animals that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

I claim:

1. Apparatus for creating a sanitary receptacle comprising:
   a. an inner member formed into a closed circular hoop having a generally rectangular cross section, a predetermined outer diameter, a predetermined wall thickness, and a predetermined length, the inner hoop being made of a sanitary plastic material;
   b. a plastic center member formed into a closed circular hoop concentric with the inner member and having a predetermined inner diameter that is about 0.25 inches greater than the outer diameter of the inner hoop to create a generally uniform first annular space between the inner hoop outer diameter and the center hoop inner diameter, the center member having a generally rectangular cross section, predetermined outer diameter and a predetermined length; and
   c. a plastic outer member formed into a closed circular hoop concentric with the inner and center members and having an inner diameter about 0.25 inches greater than the outer diameter of the center member to create a generally uniform second annular space between the center member outer diameter and the outer member inner diameter, the outer member having a generally rectangular cross section, predetermined length, and wall thickness,
   so that the three concentric members may cooperate to loosely retain a sheet of thin flexible material spanning the area of the outer member and folded into the first and second annular spaces between the respective inner, center, and outer members.

2. The apparatus of claim 1 wherein the outer diameter of the inner member is about 17 to 19 inches, and wherein the wall thickness of the inner and outer members is about 0.09 to 0.10 inches.

3. The appartus of claim 1 wherein the lengths of the inner, center, and outer members are approximately equal.

4. The apparatus of claim 3 wherein the lengths of the inner, center, and outer members are approximately 1.25 inches.

5. The apparatus of claim 1 wherein the diametral difference between the outer diameter and the inner diameter of the center member is about 0.18 to 0.20 inches.

6. A sanitary receptacle for animal waste matter comprising:
   a. a first member formed into a closed circular hoop and having a generally rectangular cross section, a predetermined outer diameter, a predetermined width and a predetermined wall thickness, the inner member being made of a sanitary plastic material;
   b. a plastic second member formed into a closed circular hoop concentric with the first member and having an inner diameter a predetermined amount greater than the outer diameter of the first member to create a generally uniform first annular space of predetermined width between the first member outer diameter and the second member inner diameter, the second member having a generally rectangular cross section and a predetermined length and wall thickness;

c. a plastic third member formed into a closed circular hoop concentric with the first and second members and having an inner diameter a predetermined amount greater than the outer diameter of the second member to create a generally uniform second annular space of predetermined width between the second member outer diameter and third member inner diameter, the third member having a generally rectangular cross section, and a predetermined length and wall thickness; and d. at least one sheet of flexible material having a thickness substantially less than the widths of the first and second annular spaces and spanning the interior of the first member and having a first fold line for folding a first portion into a first annular ring located within the first annular space and having a second fold line for folding a second portion coterminous with the first portion into a second annular ring located within the second annular space, so that the flexible material is loosely captured by the first, second, and third members in the annular space therebetween to create a receptacle having a flat interior section and walls that define a fixed confine for the waste matter.

7. The sanitary receptacle of claim 6 wherein the outer diameter of the first member is about 17 to 19 inches.

8. The sanitary receptacle of claim 6 wherein the length of the first, second, and third members is about 1.25 inches.

9. The sanitary receptacle of claim 6 wherein the wall thickness of the first, second, and third members is about 0.09 to 0.10 inches.

10. The sanitary receptacle of claim 6 wherein the inner diameter of the second member is about 0.25 inches greater than the outer diameter of the second member, and wherein the inner diameter of the third member is about 0.25 inches greater than the outer diameter of the second member.

11. A method of creating a sanitary receptacle for waste matter comprising the steps of:

a. providing inner, center, and outer thin walled hoops, the hoops having respective predetermined radial clearances therebetween;

b. providing at least one sheet of flexible material having a thickness substantially less than the radial clearances between the respective hoops and an area that spans the outer diameter of the outer hoop;

c. placing the inner hoop on a surface;

d. superimposing the sheet of flexible material on top of the inner hoop;

e. placing the center hoop on top of the sheet of material and pushing the center hoop over the inner hoop to loosely capture the sheet in the clearance between the peripheries of inner and center hoops;

f. inverting the inner and center hoops and the sheet of material captured thereby;

g. placing the outer hoop on the sheet of material extending beyond the center hoop; and h. pushing the outer hoop over the center hoop to loosely capture the sheet of the material in the clearance between the center and outer hoops.

12. A sanitary device for animals comprising:

a. a first closed hoop having a wall with a generally rectangular cross section, the first hoop having a predetermined length and terminating in longitudinally opposed first and second ends, the first hoop having a predetermined outer diameter;

b. a second closed hoop having a wall with a generally rectangular cross section and a predetermined length approximately equal to the length of the first hoop and terminating in longitudinally opposed first and second ends, the second hoop having an inner diameter a predetermined amount greater than the outer diameter of the first hoop and a predetermined outer diameter; and c. a third closed hoop having a wall with a generally rectangular cross section and having a predetermined length approximately equal to the length of the first hoop and terminating in opposed first and second ends, the third hoop having an inner diameter a predetermined amount greater than the outer diameter of the second hoop, the first, second, and third hoops being assembled concentrically to form a first generally uniform annular space between the first and second hoops and a second generally uniform annular space between the second and third hoops, with the hoop respective first and second ends being substantially coplanar to thereby enable the three hoops to cooperate to loosely retain a sheet of flexible material that has a thickness substantially less than the widths of the first and second annular spaces and that underlies the first end of the first hoop and extends into the first annular space and is folded along the second hoop second end and extends into the second annular space and underneath the third hoop first end.

* * * * *